United States Patent [19]
Harvey

[11] 3,799,328
[45] Mar. 26, 1974

[54] ENDLESS BAND CONVEYORS

[75] Inventor: George Arthur Harvey, Blakedown, England

[73] Assignee: Umec-Boydell (Belting) Limited, West Bromwick, England

[22] Filed: Sept. 14, 1972

[21] Appl. No.: 288,942

[30] Foreign Application Priority Data
Oct. 15, 1971 Great Britain .................... 42997/71

[52] U.S. Cl. .............................................. 198/195
[51] Int. Cl. .......................................... B65g 15/30
[58] Field of Search ..................... 198/189, 195, 193

[56] References Cited
UNITED STATES PATENTS
| | | | |
|---|---|---|---|
| 3,416,645 | 12/1968 | Jones | 198/195 X |
| 3,333,678 | 8/1967 | Rodman | 198/195 X |
| 2,703,644 | 3/1955 | Lake | 198/195 |
| 1,376,449 | 5/1921 | McKenzie | 198/195 X |

*Primary Examiner*—Edward A. Sroka
*Attorney, Agent, or Firm*—Kemon, Palmer & Estabrook

[57] ABSTRACT

In an endless band conveyor in which the endless band is composed of load-bearing components hinged to and supported by rod members extending transversely of the direction of travel of the band, the load-bearing components are moulded plastics modules which releasably clip onto the rod members. The modules have C-shaped connecting portions with mouths opening into their interiors by way of which the rod members can be engaged in the connecting portions by movement of the connecting portions laterally of the rod members, to clip the modules onto the rod members.

8 Claims, 4 Drawing Figures

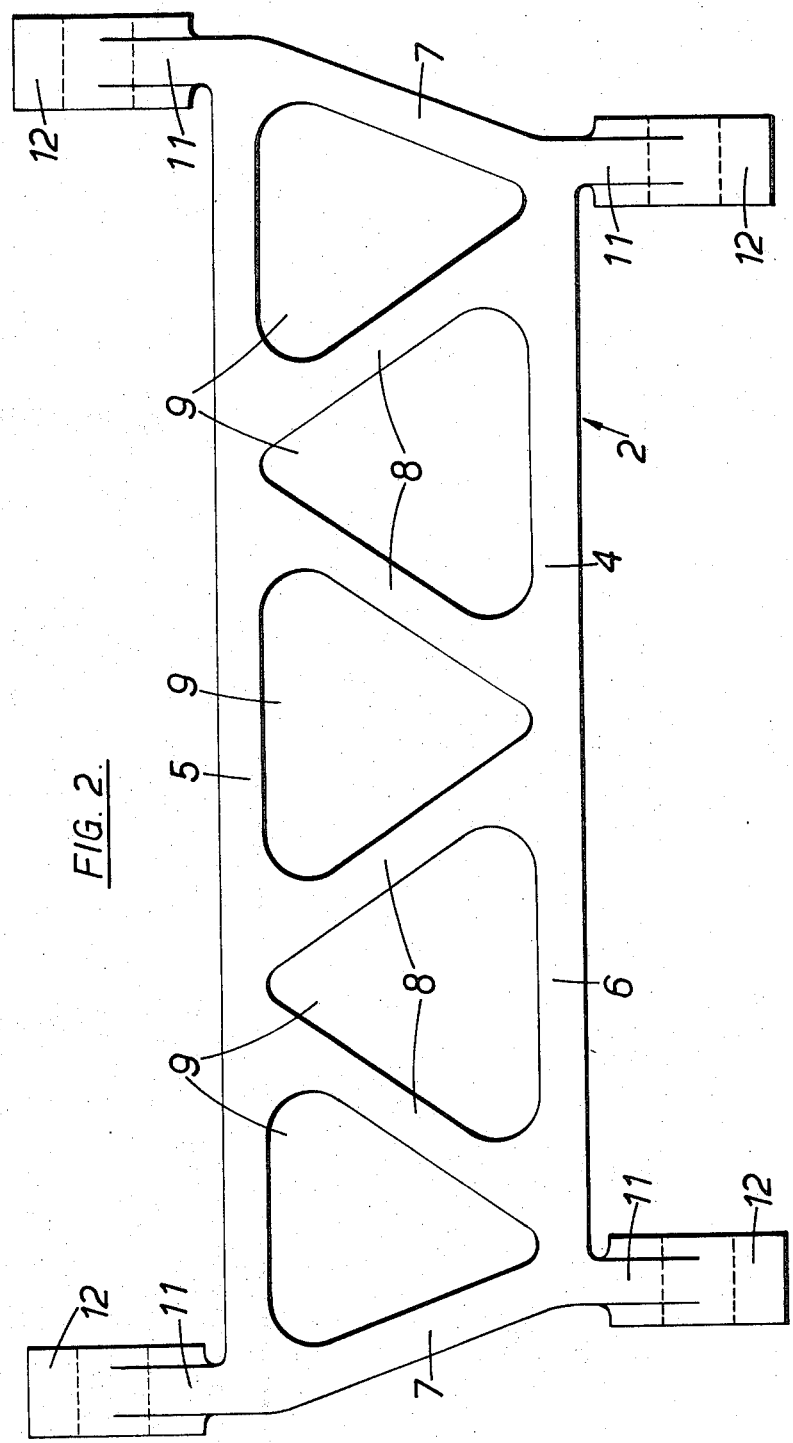

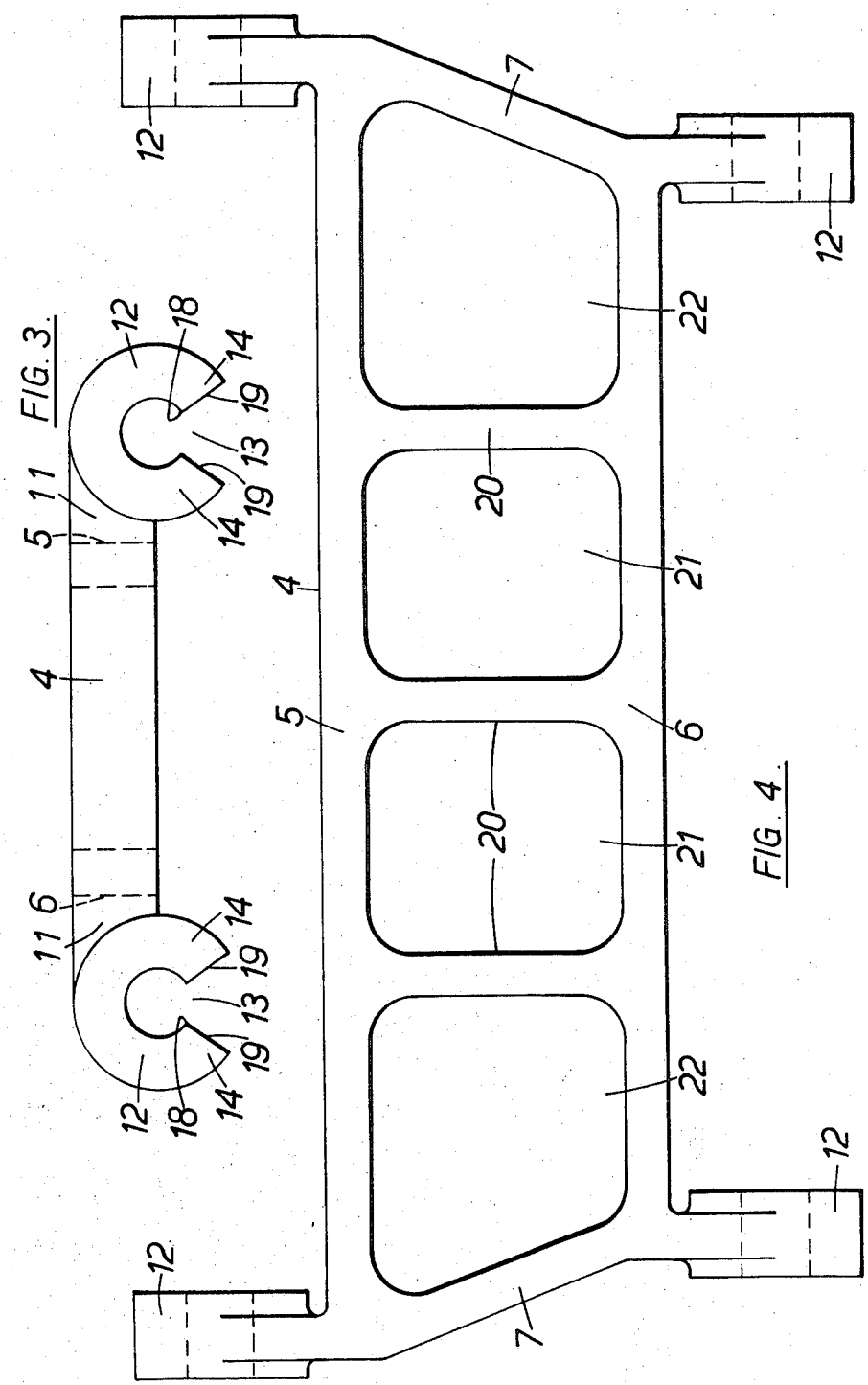

ENDLESS BAND CONVEYORS

This invention relates to endless band conveyors of the kind in which the band is constructed of load-bearing components hingedly connected to and extending between spaced rod members which extend transversely of the direction of travel of the conveyor band. Such endless band conveyors are hereinafter referred to as "of the kind described."

According to a first aspect of the present invention there is provided an endless band for a conveyor of the kind described wherein the load-bearing components are moulded plastics modules having connecting portions at which the modules are hingedly attached to the rod members, the connecting portions having jaw parts defining mouths into the interiors of the connecting portions by way of which the connecting portions are releasably clipped onto the rod members by movement laterally of the rod members.

Because they are able to be clipped onto the rod members the modules can be readily removed for attention and replacement if required without having to disassembly the rod members from the band, and this may be done by an unskilled person. Varying the length of the band may also be facilitated.

According to a further aspect of the present invention a moulded plastics module is provided which is constructed and arranged to be used in an endless band in accordance with the first aspect of the invention to form the load-bearing components thereof, the module having connecting portions at which it is adapted to be hingedly attached to the transverse rod members of the conveyor band, and the connecting portions having jaw parts defining mouths into the interiors of the connecting portions by way of which the connecting portions are able to be releasably clipped onto the rod members by movement laterally of the rod members.

Each connecting portion may be of substantially C-shaped cross-section or at least be of a cross-section which like the letter C has an aperture with a restricted entry at one side. The entry provides the mouth of the connecting portion and the parts of the C extending to the mouth form the jaws thereof.

In general the width of the mouths of the connecting portions at least at their inner ends, will be smaller than the width of the cross-section of the rod members so that as the connecting portions are clipped onto the rod members their jaw parts are caused to be urged apart to allow the rod members to pass through the mouths.

The modules may be moulded from any suitable plastics material. The material is required to be basically stiff but normally to have sufficient inherent resilience to permit the connecting portions to be clipped onto the rod members. A suitable material is nylon, especially glass-reinforced nylon, because of its additional self-lubricating properties.

Normally each module will be attached to a rod member by at least two connecting portions although in some instances the attachment might possibly be made by just one connecting portion. The connecting portions may be formed integrally with arm or stem portions which extend from the leading and trailing sides of the modules. The connecting portions may be arranged such that those of the modules in the conveyor band which are adjacent to one another in the longitudinal direction of the band are staggered with respect to one another, or they intermesh, or are otherwise suitably positioned to enable them to clip onto a common rod member. If say there are two spaced apart connecting portions at each side of the module, those of one side may be more widely spaced than those of the opposite side. Thus the less widely spaced connecting portions of one of two longitudinally adjacent modules of the conveyor band may be positioned between and in axial alignment with the more widely spaced connecting portions of the other module.

The transverse rods preferably have lateral protrusions which co-operate with the connecting portions of at least some of the modules fitted to the rods to restrain the modules from movement lengthwise of the rods, and thereby avoid undesirable shifting of the modules laterally of the band which could be detrimental to the operation of the conveyor in which the band is provided in use and possibly cause breakdown of the conveyor. The protrusions may be presented by kinks, joggles, waves or the like formed in the rods, or possibly by changes in the cross-sectional dimensions of the rods or by elements secured to the rods to project therefrom.

An embodiment of the invention will now be described by way of example with reference to the accompanying drawings in which, FIG. 1 is a plan view of part of the endless conveyor in accordance with the present invention;

FIG. 2 is an enlarged plan view of a module included in the band;

FIG. 3 is a side view of the module shown in FIG. 2, and

FIG. 4 is a plan view of an alternative form of module.

Figure 1:
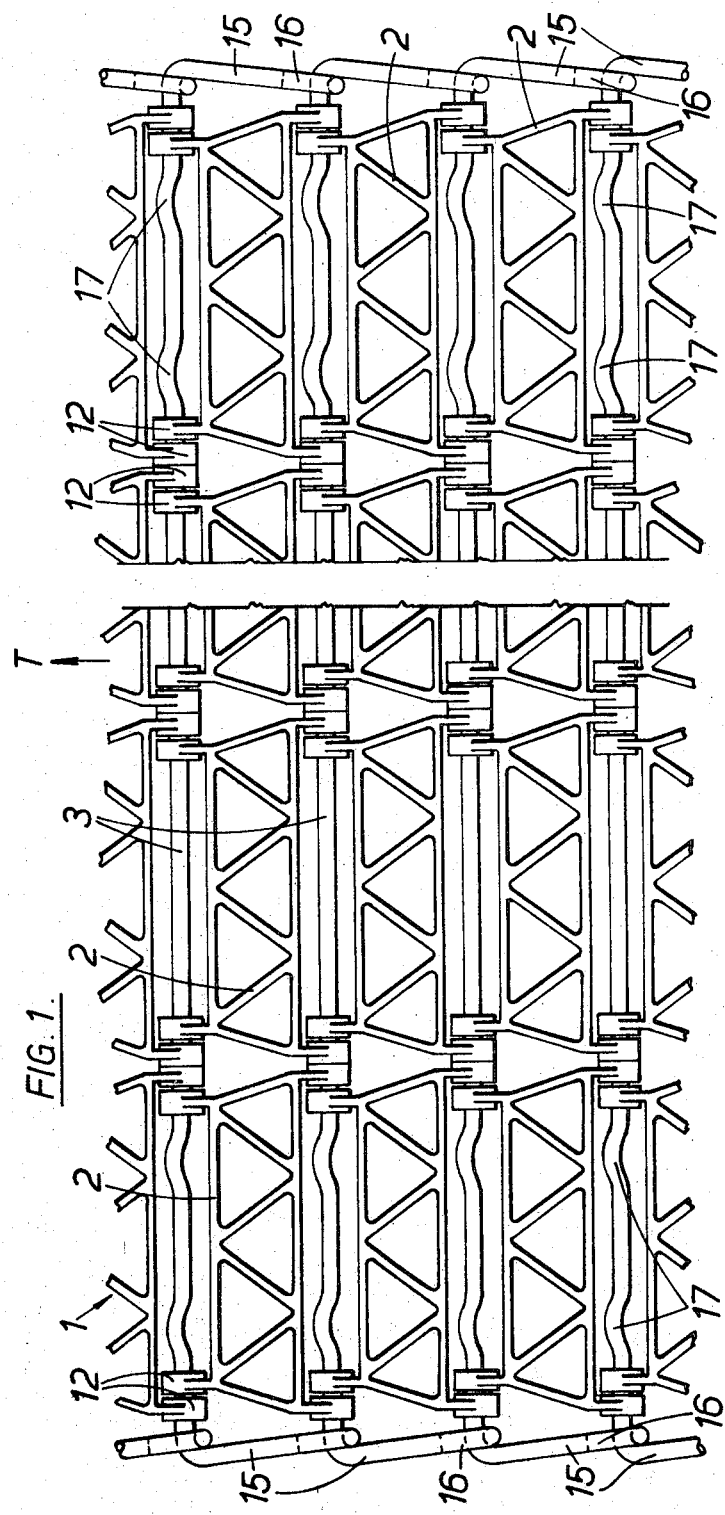

The endless band of this embodiment is suitable for a conveyor for use in a filtration system. The band 1 is composed of load-bearing modules 2 of open-work form moulded from plastics material which are hingedly connected to and extend between spaced rods 3 which extend transversely of the direction of travel of the band indicated by arrow T. Between each adjacent pair of rods 3 there is a row of modules 2 disposed close together side-by-side across the width of the band 1. The modules 2 are made of glass-reinforced nylon.

Each module 2 has an oblong body 4 which extends transversely of the band 1 parallel to the rods 3. Sides 5, 6 of the body 4 are parallel and one side 5 is longer than the other. The sides 5, 6 are joined by straight ends 7 of the body 4 which incline inwardly at similar angles from the longer side 5 to the shorter side 6. The sides 5, 6 and ends 7 are of bar form of oblong rectangular cross-section disposed on edge. Between and integrally joined to the side bars 5, 6 are cross bars 8 disposed in zig-zag fashion across the body 4 such that between the cross, side and end bars triangular openings 9 are defined. The cross bars 8 are also of oblong rectangular cross-section disposed on edge. All the bars of the body 4 are of similar thickness and depth. They present a skeletal flat top surface 10 of the module, FIG. 3.

Integral with and projecting at right angles from each side bar 5, 6 of the body 4 are two stems 11 disposed one at each end of the bar. Each stem 11 has an integral connected portion 12 of short split-tube form so that its cross-section is generally C-shaped, as can be seen in FIG. 3, and the central axis of the connecting portion 12 extends parallel to the adjacent side bar 5, 6. The mouth of the C, indicated at 13 in the drawings, is flared and is at the bottom of the module 2. The connecting portions 12 of each side bar 5, 6 are co-axial. The connecting portions 12 on the shorter side bar 6 are less widely spaced apart than those on the longer side bar 5, the spacing of the connecting portions 12 on the two side bars 5, 6 being such that those on the shorter side bar 6 will fit without lateral play between the connecting portions on the longer side bar 5 of a similar module. Parts 14 of the connecting portions 12 adjacent the mouths 13 form jaws of those portions.

The transverse rods 3 are of round section. End portions 15, FIG. 1, of each rod are bent through more than 90° such that they extend from the same side of the main part of the rod and are inclined inwardly towards one another. The extremities of the end portions 15 are shaped into hooks 16 by which the rod is hingedly connected to its neighbour in the conveyor band. The hooks 16 engage with the neighbouring rod at the main part of the latter immediately adjacent the angle between the main part and the end portions, and in that way the rods are restrained from movement relative to one another laterally of the band. In the main part of each rod 3 but near to the end portions 15 pairs of waves 17 are formed.

The modules 2 are mounted between adjacent rods 3 by pushing their connecting portions 12 down onto the rods to snap them resiliently over the rods, and hence securely but detachably clip them to the rods. The internal diameter of the connecting portions 12 is slightly greater than the diameter of the rods 3 so that they can turn about the rods and hingedly connect the modules to the members. Inner ends 18 or throats of the mouths 13 are narrower than the diameters of the rods 3 but the entries of the mouths are wider to enable the mouths to receive the rods readily for attaching the connecting portions to the rods. The interaction of mutually inclined surfaces 19 of the flared mouths 13 with the cylindrical surfaces of the rods 3 causes the jaw parts 14 of the connecting portions to be urged apart resiliantly to permit the rods to enter into the connecting portions.

The connecting portions 12 at adjacent sides of successive modules 2 in the lengthwise direction of the convenyor band 1 are clipped onto the same rods 3, the connecting portions of the shorter side bars 6 of one module being co-axially positioned between those of the longer side bars 5 of the adjacent module.

The connecting portions of the modules at the ends of the rows of modules extending transversely of the conveyor band engages with the parts of the rods 3 containing the waves 17. The waves prohibit movement of the connecting portions, and therefore of those end modules, lengthwise of the rods. Since the modules in the transverse rows fit closely together the intermediate modules of the rows are consequently restrained from movement lengthwise of the rods as well. Therefore shifting of the modules laterally of the band is prevented, thus encouraging smooth travel of the band and the articles it carries in use and avoiding the possibility of breakdowns occurring from such shifting.

In another form of module shown in FIG. 4, the body 4 of the module has cross bars 20 which extend at right angles to the side bars 5, 6. Thus the intermediate part of the body 4 has rectangular openings 21 defined by the side bars 5, 6 and cross bars 16, and at opposite ends of the body trapezium shaped openings 22 are defined by the end bars 7 of the body and the side and cross-bars. In all other respects the module is similar to that previously described.

It will be understood that the bodies of the modules may take other forms as desired to suit the requirements of use of the conveyor band. If necessary the modules may be formed with stiffening flanges, vanes, web or like formations, preferably on their undersides. It may, for example, be desirable in some applications for such formations which extend longitudinally in the direction of travel of the band to strengthen the modules between transverse rods. If desired the modules which are at the ends of a row extending transversely of the band may have at their outer ends, which form the side edges of the band, fixing flange portions to which side wall members may be secured along the sides of the band, the side wall members projecting above the level of the top surfaces of the modules. Alternatively the modules may have integral side-wall forming parts.

I claim:

1. An endless conveyor band comprising spaced rod members extending transversely of the direction of travel of said band, and load-bearing components hingedly connected to and extending between said rod members, said load-bearing components being moulded plastics modules each having at each of two opposite sides at least two alinged connecting portions at which said module is hingedly attached to two of said rod members, said connecting portions having jaw parts which define mouths into said connecting portions by way of which said connecting portions are releasably clipped onto said rod members by movement laterally of said rod members, and said connecting portions at one of said opposite sides of each said module being less widely spaced apart than those of the other one of said opposite sides, said less widely spaced connecting portions of each said module being positioned between and in alignment with said more widely spaced connecting portions of another similar module adjacent thereto in the lengthwise direction of the band.

2. An endless conveyor band according to claim 1 wherein each said module has a body comprising a pair of parallel side bars, one said side bar being shorter than the other said side bar, end bars which extend transversely between and join said side bars at their ends, and cross bars which extend between and are joined to said side bars at intermediate parts of their lengths, said connecting portions of each said module extending from said side bars adjacent said ends thereof.

3. An endless conveyor band according to claim 1 wherein between each adjacent pair of said rod members there is a row of said modules clipped onto said rod members side-by-side across the width of said band, and said rod members have lateral protrusions which are positioned between and co-operate with said less widely spaced connecting portions of said modules at the ends of said rows of modules and restrain and modules from movement along said rod members.

4. An endless conveyor band according to claim 3 wherein said protrusions are presented by wave formations in said rod members.

5. An endless conveyor band comprising spaced rod members extending transversely of the direction of travel of said band and coupled together at their ends, and load-bearing components hingedly connected to and extending between said rod members, said load-bearing components being moulded plastics modules each having a horizontal load-supporting surface, and at two opposite sides similar connecting portions which are shorter than said sides and at which said module is hingedly attached to two of said rod members which are adjacent to one another, said connecting portions each being of substantially C-shaped cross-section and comprising two opposed resilient jaw parts which together define a flared mouth of said C-shape directed downwards away from said load-supporting surface and having a throat of narrower width than the cross-sections of said rod members, and said connecting portions being releasably clipped, by way of said mouths, onto said rod members by movement of said connecting portions laterally of said rod members, and said connecting portions of each said module intercalating with and being aligned with the connecting portions of similar modules which are adjacent thereto in the lengthwise direction of the band.

6. An endless conveyor band according to claim 5 wherein said modules each have at each of said opposite sides integral stem portions which extend from said sides in the lengthwise direction of the band and integral with which are said connecting portions spaced from said sides.

7. A load-bearing component for an endless conveyor band constructed in part of spaced transverse rod members, comprising a moulded plastics module having at each of two opposite sides thereof at least two aligned connecting portions by which said module is adapted to be hingedly attached to two of the rod members of the conveyor band, said connecting portions having jaw parts which define mouths into said connecting portions by way of which said connecting portions are able to be releasably clipped onto the rod members by movement laterally of the rod members, and said connecting portions at one of said opposite sides being less widely spaced apart than those of the other one of said opposite sides, the arrangement being such that said less widely spaced connecting portions are able to be positioned between and in alignment with the more widely spaced connecting portions of another similar module.

8. A load-bearing component for an endless conveyor band constructed in part of spaced transverse rod members, comprising a moulded plastics module having a horizontal load-supporting surface, and at two opposite sides connecting portions which are shorter than said sides and by which said module is adapted to be hingedly attached to two of the rod members of the conveyor band, said connecting portions each being of substantially C-shaped cross-section and comprising two opposed resilient jaw parts which together define a flared mouth of said C-shape directed downwards away from said load-supporting surface and having a throat of narrower width than the cross-sections of the rod members, said connecting portions being able to be releasably clipped, by way of said mouths, onto the rod members by movement of said connecting portions laterally of the rod members, and said connecting portions of said two opposite sides being positioned in relation to one another in such manner that they are able to intercalate with and be aligned with the connecting portions of similar modules when said module is attached to the rod members.

* * * * *

UNITED STATES PATENT OFFICE
CERTIFICATE OF CORRECTION

Patent No. 3,799,328         Dated March 26, 1974

Inventor(s) George Arthur Harvey

It is certified that error appears in the above-identified patent and that said Letters Patent are hereby corrected as shown below:

Column 1, line 23    "dissassembly" should read ---dissassemble---

Column 4, line 59    the "and" after "restrain" should read ---said---

Signed and sealed this 17th day of September 1974.

(SEAL)
Attest:

McCOY M. GIBSON JR.
Attesting Officer

C. MARSHALL DANN
Commissioner of Patents